July 26, 1960 G. E. CHITTENDEN 2,946,193
HYDRAULIC MOTOR SYSTEMS
Filed Jan. 8, 1959
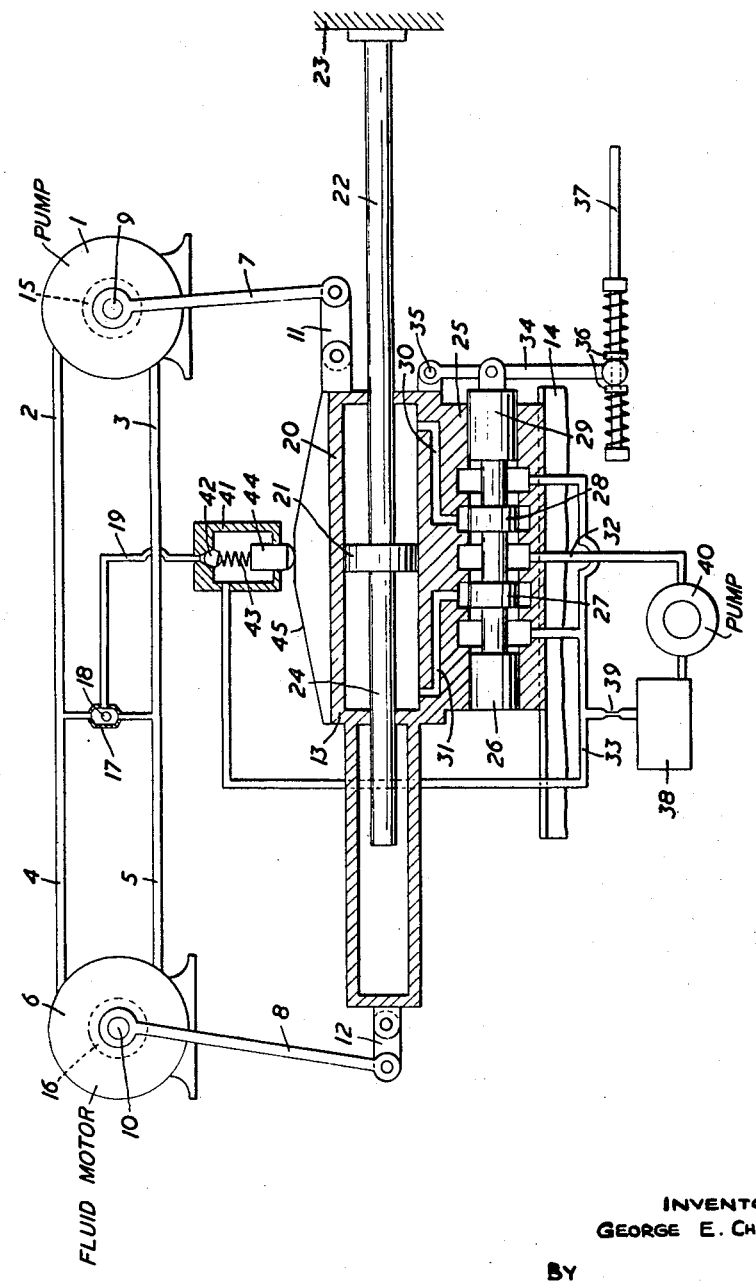
INVENTOR
GEORGE E. CHITTENDEN
BY
Watson, Cole, Grindle & Watson
ATTORNEY

United States Patent Office 2,946,193
Patented July 26, 1960

2,946,193

HYDRAULIC MOTOR SYSTEMS

George Edward Chittenden, Allesley, Coventry, England, assignor to The Keelavite Company Limited, Coventry, England, a British company Filed Jan. 8, 1959, Ser. No. 785,685

Claims priority, application Great Britain Jan. 8, 1958

18 Claims. (Cl. 60—53)

This invention relates to hydraulic power transmission systems of the kind comprising a power driven pump of the displacement type with means for connecting its delivery passage to the inlet passage of a main hydraulic motor also of the displacement type, connected to a driven member, the outlet passage of which motor is connected to the inlet passage of the pump, either the pump or the motor or both being of the variable capacity type to enable the ratio of transmission as between the pump and motor to be varied. Such power transmission systems may find application for many different purposes including hoisting gear, for example for cranes, or hydraulic drives for vehicles, and an object of the invention is to provide such a system in which the torque exerted by the motor at any particular speed can be limited to a predetermined value without undue waste of power.

The invention is applicable to systems in which torque can be applied by the motor to the driven member in one direction only or in either direction, that is to say to drive the driven member in either direction at will and/or to apply a braking force to the driven member in one direction or in each direction.

A hydraulic transmission system of the above kind according to the present invention includes a hydraulic servo motor the piston or like operating member of which is arranged to control the capacity of the pump and/or the main motor to vary the transmission ratio of the system while the pilot valve of the servo motor is arranged to be operated by a control member, and means are provided for connecting the outflow passage from the hydraulic servo motor to a source of fluid pressure automatically if and when the working pressure acting on the main motor exceeds a determined value.

Preferably means are also provided for varying the said determined value automatically with variations in the transmission ratio, whereby for each transmission ratio there is a determined working pressure at which an increased back pressure is imposed upon the outlet from the hydraulic servo motor to resist or slow up the operation of such servo motor and hence any change of gear ratio.

In a simple arrangement the outflow passage of the servo motor includes a restriction and is connected on the side of that restriction adjacent to the servo motor to a passage arranged to receive fluid under pressure through spring pressed valve apparatus from the inlet or outlet passage of the main motor, the spring pressed valve apparatus being arranged to open automatically when the pressure in such inlet or outlet passage exceeds a determined value, and means for varying the effective spring pressure of the spring pressed valve apparatus with movements of the member or members by which the capacity of the pump and/or main motor is varied so as to vary the "determined" value of the pressure at which such valve apparatus opens.

It will be seen that for each transmission ratio there will be a determined working pressure at which the spring pressed valve apparatus opens and thus causes the pressure on the upstream side of the restriction, that is to say the back pressure on the servo motor, to be raised so as to check, slow up or even cause reverse movement of the servo motor and hence check or slow up any change of transmission ratio being effected by the servo motor or even cause a reversal in the sense in which a change of ratio is effected. Accordingly, until such time as the working pressure again falls to a value less than the determined value at which the spring-pressed valve apparatus opens, a rise in the transmission ratio or, where the motor is being driven by the driven member, and applying a braking force thereto as during deceleration, a reduction in the gear ratio, will be prevented.

The invention may be carried into practice in various ways and applied to hydraulic power transmission systems for various purposes but one example of the invention is illustrated somewhat diagrammatically by way of example in the accompanying drawings in which the servo motor and spring-pressed valve apparatus are shown diagrammatically in cross section.

In the arrangement shown, the power transmission system comprises a pump 1, the inlet and outlet passages 2 and 3 of which are connected respectively to the outlet and inlet passages 4 and 5 of a hydraulic motor 6, both the pump 1 and the motor 6 being of the variable capacity displacement type so that the transmission system represents, in effect, a positive power transmission system the ratio of which is variable by varying the capacity of the pump and motor. In the drawing, 7 and 8 represent control levers pivoted respectively at 9 and 10 by which respectively the capacity of the pump 1 and of the motor 6 can be varied in opposite senses. These two levers are connected respectively by links 11 and 12 to the movable casing of a hydraulic servo motor indicated generally at 13, this casing being mounted to slide upon a bed indicated at 14.

In the arrangement shown, the pump 1 is assumed to be connected to a prime mover through a driving member indicated at 15 while the motor 6 is connected to a driven member indicated at 16, which might for example be the lifting drum of a crane or a member connected to the track wheels of a vehicle.

In the arrangement shown, the passages 2, 4 and 3, 5 are connected to the casing of an automatic selector valve 17 which, by automatic movement therein of a ball valve 18, connects whichever of the two passages 2, 4 and 3, 5 happens at any moment to be at the higher pressure to a passage 19.

The servo motor comprises a cylinder 20 formed within the casing 13 and containing a double acting piston 21 having a piston rod 22 rigidly connected to a fixed structure indicated at 23, the piston also having a projection 24 which corresponds in diameter to the piston rod 22 and passes through the end of the cylinder 20 remote from the piston rod 22 so that the effective areas of the two faces of the piston 21 are the same.

Also formed within the casing 13 is the servo valve housing 25 containing a piston type servo valve of well known kind having four lands 26, 27, 28 and 29 arranged to control communication between inlet and outlet passages 30 and 31 communicating with opposite ends of the cylinder 20, a servo fluid inlet passage 32 and a servo fluid outlet passage 33 in such manner that, upon movement of the servo valve in one direction or the other from the position shown, the inlet 32 is connected to one end of the cylinder 20, while the other end of the cylinder is connected to the relief passage 33 whereby the casing 13 is caused to move relatively to the piston 21.

The servo valve is arranged to be operated by a lever 34 pivoted at 35 to the casing 13 and acted upon by two spring-pressed thrust members 36 on a control rod 37 so that movement of the control rod 37 in either direction causes movement of the servo valve in the same direction, which in turn causes movement of the casing 13 also in the same direction to restore the servo valve to the position shown relatively to the casing.

It will be understood that the passages 32 and 33 will in practice, include appropriate flexible sections to allow for movement of the casing 13.

The outlet passage 33 is connected to a reservoir 38 through a restriction 39, this reservoir being that from which a servo fluid delivery pump indicated at 40 delivers fluid to the passage 32. Arranged between the passage 19 and the passage 33 is spring-pressed valve apparatus, shown diagrammatically as comprising a casing 41 having an inlet port communicating with the passage 19 and normally closed by a valve 42 acted upon by one end of a spring 43 the other end of which bears against a movable abutment member 44. The position of the abutment member 44 is determined by a cam 45 formed on the casing 13, so that, as the casing 13 moves to vary the transmission ratio by adjustment of the pump and motor, the pressure exerted on the ball valve 42 by the spring 43 is varied in accordance with a predetermined law. In the arrangement shown diagrammatically the cam 45 is shown as having a flat central section and two approximately straight inclined end sections, but it will be understood that the form of the cam may be varied widely to suit requirements. The passage 33 communicates with the interior of the casing 41 as shown.

In operation, the control rod 37 may be arranged to control the transmission ratio through the servo motor independently of other controls, such as that for example controlling the speed of the prime mover driving the pump 1, or may be arranged to be operated by any control member which simultaneously controls the speed of the prime mover and the transmission ratio in accordance with some predetermined law or otherwise, depending upon the kind of apparatus with which the transmission apparatus is used. In all cases, however, it will be seen that for each transmission ratio, as determined by the position of the casing 13, there will be a determined pressure in whichever of the pipes 2, 4 or 3, 5 is at higher pressure, at which the valve 42 will open to admit working fluid under pressure to the passage 33. In view of the restriction 39 this will produce a corresponding rise in the pressure in the passage 33 and hence check, prevent or even reverse the flow from the servo motor through this passage 33 and thereby check, prevent or even reverse the direction of movement of the casing 13 which would normally take place under the control of the rod 37.

Assuming, therefore, for example, that with the prime mover operating at constant speed the operator moves the rod 37 in a manner which would normally produce a gear ratio at which an excessive pressure would occur in one or other of the pipes 2, 4 or 3, 5 the movement of the casing 13 towards this gear ratio, is slowed up or checked, until the pressure in the pipe 2, 4 or 3, 5 concerned drops to a value at which the valve 42 closes. Moreover the apparatus functions in the manner indicated above not only if the pressure in the pipe 3, 5 exceeds a predetermined value due for example to an attempt being made to raise the gear ratio more rapidly than is desirable, but also if, due to an attempt being made to reduce the gear ratio too suddenly with a view to applying a braking force to the driven member 16 to cause deceleration, an excessive pressure occurs in the pipe 2, 4.

Thus, in the case of the application of the invention to a crane, the maximum load which can be placed upon the prime mover at each gear ratio can be determined in accordance with requirements.

Moreover in the case of a transmission system for a vehicle, for example, a locomotive vehicle, the arrangement may so limit the torque which can be applied to the track wheels in the driving and/or in the braking direction as normally to guard against the application of a torque such as would cause the track wheels to skid upon the track. At the same time, the arrangement may be such that at each operating condition substantially the maximum driving or braking torque which can be applied without risk of such skidding, can be so applied.

What I claim as my invention and desire to secure by Letters Patent is:

1. Control apparatus for a hydraulic transmission system which includes a power driven pump of the displacement type having inlet and outlet passages, a hydraulic motor of the displacement type which drives a driven member and has inlet and outlet passages, passage means connecting the outlet passage of said pump to the inlet passage of said motor and the outlet passage from said motor to the inlet passage of said pump, and operative transmission ratio varying means between said pump and said motor, including a hydraulic servo motor provided with a hydraulic fluid-in-flow passage and a hydraulic fluid outflow passage and having a movable operating member which is operatively connected to said transmission varying means, a pilot valve, which is operated by a control member, for controlling the movement of said movable operating member, and automatic means operated by the hydraulic pressure in the said passage means, which impose an automatic overriding control on the movement of the movable operating member in said hydraulic servo motor.

2. Control apparatus as claimed in claim 1 in which said automatic overriding control means act to control the flow of fluid through the outflow passage from said hydraulic servo motor.

3. Control apparatus as claimed in claim 2 in which said automatic overriding control means act to operatively connect the outflow passage from said hydraulic servo motor to a source of fluid pressure.

4. Control apparatus as claimed in claim 3 including means operatively connected to the transmission ratio varying means and the means for connecting said outflow passage to a source of fluid pressure with variations in the transmission ratio.

5. Control apparatus as claimed in claim 4 including a restriction in said outflow passage, a pressure passage operatively connected into said outflow passage on the side of said restriction adjacent said servo motor, and spring-pressed valve apparatus operatively connected between said pressure passage and said passage means.

6. Control apparatus as claimed in claim 5, in which said spring-pressed valve apparatus includes a spring urging the valve apparatus into a closed position, an abutment for said spring movable to vary the force applied by said spring to said valve apparatus said abutment being operatively connected to move with said movable operating member of said hydraulic servo motor.

7. Control apparatus as claimed in claim 6, in which said outflow passage communicates with a reservoir for hydraulic fluid downstream of said restriction and the hydraulic servo motor is supplied with hydraulic fluid by a second hydraulic pump which draws fluid from said reservoir.

8. Control apparatus for a hydraulic transmission system, which includes a power-driven pump of the displacement type having inlet and outlet passages, a hydraulic motor of the displacement type which drives a driven member and has inlet and outlet passages, passage means connecting the outlet passage of said pump to the inlet passage of said motor and the outlet passage from said motor to the inlet passage of said pump, and operative transmission ratio varying means between said pump and said motor, including a hydraulic servo motor provided with a hydraulic fluid inflow passage and a hydraulic fluid outflow passage and having a movable operating member which is operatively connected to said transmission varying means, a pilot valve, which is operated by a control member, for controlling the movement of said movable operating member, automatic means operated by the hydraulic pressure in the said passage means which impose an automatic overriding control on the movement of the movable operating member in said hydraulic servo motor and means operatively connected to the transmission varying means and the automatic overriding control means which automatically vary the hydraulic pressure at which said automatic overriding control means operate with variations in the transmission ratio.

9. Control apparatus as claimed in claim 8 in which said automatic overriding control means act to control the flow of fluid through the outflow passage from said hydraulic servo motor.

10. Control apparatus as claimed in claim 9 in which said automatic overriding control means act to operatively connect the outflow passage from said hydraulic servo motor to a source of fluid pressure.

11. Control apparatus as claimed in claim 10, including a restriction in said outflow passage, a pressure passage operatively connected into said outflow passage on the side of said restriction adjacent said servo motor, and spring-pressed valve apparatus operatively connected between said pressure passage and said passage means.

12. Control apparatus as claimed in claim 11 in which said spring-pressed valve apparatus includes a spring urging the valve apparatus into a closed position, an abutment for said spring movable to vary the force applied by said spring to said valve apparatus, said abutment being operatively connected to move with said movable operating member of said hydraulic servo motor.

13. Control apparatus as claimed in claim 12 in which said outflow passage communicates with a reservoir for hydraulic fluid downstream of said restriction and the hydraulic servo motor is supplied with hydraulic fluid by a second hydraulic pump which draws fluid from said reservoir.

14. Control apparatus for a hydraulic transmission system which includes a power driven pump of the displacement type having inlet and outlet passages, a hydraulic motor of the displacement type which drives a driven member and has inlet and outlet passages, passage means connecting the outlet passage of said pump to the inlet passage of said motor and the outlet passage from said motor to the inlet passage of said pump, and operative transmission ratio varying means between said pump and said motor, including a hydraulic servo motor provided with a hydraulic fluid inflow passage and a hydraulic fluid outflow passage and having a movable operating member which is operated by a control member, and a device which is connected to the inlet and outlet passages of said pump which operatively connects whichever passage is momentarily at the higher pressure to the outflow passage from said hydraulic servo motor through a pressure operated device which is only actuated to complete the operative connection when the pressure in the selected inlet or outlet passage is above a predetermined value.

15. Control apparatus as claimed in claim 14 including automatic means operatively connected to the transmission ratio varying means and to the said pressure operated device which automatically vary the predetermined pressure value at which said pressure operated device is actuated to connect said outflow passage to said inlet or outlet passage with variations in the transmission ratio.

16. Control apparatus as claimed in claim 14, including a restriction in said outflow passage, a pressure passage operatively connected into said outflow passage on the side of said restriction adjacent said servo motor, and spring-pressed valve apparatus operatively connected between said pressure passage and whichever of said inlet and outlet passages is momentarily at the higher pressure.

17. Control apparatus as claimed in claim 16 in which said spring-pressed valve apparatus includes a spring urging the valve apparatus into a closed position, an abutment for said spring movable to vary the force applied by said spring to said valve apparatus, said abutment being operatively connected to move with said movable operating member of said hydraulic servo motor.

18. Control apparatus as claimed in claim 17 in which said outflow passage communicates with a reservoir for hydraulic fluid downstream of said restriction and the hydraulic servo motor is supplied with hydraulic fluid by a second hydraulic pump which draws fluid from said reservoir.

References Cited in the file of this patent

UNITED STATES PATENTS

| | | |
|---|---|---|
| 2,500,580 | Segsworth | Mar. 14, 1950 |
| 2,718,877 | Rishel et al. | Sept. 27, 1955 |
| 2,801,618 | Place et al. | Aug. 6, 1957 |